United States Patent
Taniguchi

(10) Patent No.: US 6,853,311 B2
(45) Date of Patent: Feb. 8, 2005

(54) ALARM APPARATUS FOR MOTOR VEHICLE

(75) Inventor: Shinji Taniguchi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 64 days.

(21) Appl. No.: 10/461,387

(22) Filed: Jun. 16, 2003

(65) Prior Publication Data

US 2004/0145460 A1 Jul. 29, 2004

(30) Foreign Application Priority Data

Jan. 24, 2003 (JP) ........................................ 2003-016151

(51) Int. Cl.[7] ................................................ G08G 1/16
(52) U.S. Cl. .................... 340/903; 340/435; 340/436; 340/426.1; 340/426.18; 340/539.23; 364/461; 701/300
(58) Field of Search ................................ 340/903, 435, 340/436, 426.1, 426.18, 539.23

(56) References Cited

U.S. PATENT DOCUMENTS

| | | | | |
|---|---|---|---|---|
| 5,357,438 A | * | 10/1994 | Davidian | 701/301 |
| 5,684,473 A | * | 11/1997 | Hibino et al. | 340/903 |
| 5,760,708 A | * | 6/1998 | Seith | 340/903 |
| 5,959,572 A | * | 9/1999 | Higashimata et al. | 342/70 |
| 6,014,601 A | * | 1/2000 | Gustafson | 701/45 |
| 6,590,495 B1 | * | 7/2003 | Behbehani | 340/435 |

FOREIGN PATENT DOCUMENTS

| | | |
|---|---|---|
| JP | 54-118036 A | 9/1979 |
| JP | 08-293099 A | 11/1996 |
| JP | 2002-274303 A | 9/2002 |

* cited by examiner

*Primary Examiner*—Daniel Wu
*Assistant Examiner*—Samuel J. Walk
(74) *Attorney, Agent, or Firm*—Sughrue Mion, PLLC

(57) ABSTRACT

Alarm apparatus for a motor vehicle includes sensor (101) for detecting an object distance (Do) rearward of the vehicle, means (103) for detecting a vehicle speed (V), means (104) for detecting a traveling direction sideward of the vehicle, a control means (102) for generating an alarm signal (E) on the basis of object distance (Do), vehicle speed (V) and traveling direction (P), alarm (105) driven in response to the alarm signal (E), means (102a) for measuring a time lapse (T) since detection of the traveling direction (P), and means (102b) for setting an alarm distance serving as a comparison reference for the object distance (Do). The alarm (105) is driven when vehicle speed (V) lies within a predetermined range with the time lapse (T) falling within a predetermined time (T1) and when object distance (Do) laterally rearward of the vehicle lies within the alarm distance.

6 Claims, 4 Drawing Sheets

ALARM APPARATUS FOR MOTOR VEHICLE

BACKGROUND OF THE INVENTION

1. Field of the Invention

The present invention generally relates to an alarm apparatus for a motor vehicle for issuing an alarm upon detection of an obstacle (e.g. another motor vehicle) existing laterally rearward of a traveling motor vehicle. More particularly, the present invention is concerned with an alarm apparatus for a motor vehicle which is capable of preventing generation of an erroneous alarm due to detection of a stationary object such as a guardrail without incurring any appreciable increase in the cost.

2. Related Art

Heretofore, there has been proposed an alarm apparatus for a motor vehicle for detecting an obstacle existing in the vicinity of the motor vehicle by means of a range-finding sensor or the like for issuing a relevant message to a driver in the course of traveling with a view to evading accidents or mishaps.

Some of the alarm apparatuses of the type mentioned above are so arranged as to generate an alarm when a succeeding motor vehicle existing in the lane changing direction of a motor vehicle traveling ahead (hereinafter referred to as the own motor vehicle only for the convenience of description) for thereby detecting imprudent overtaking of the succeeding motor vehicle by making decision as to whether or not the succeeding motor vehicle exists obliquely rearward of the own motor vehicle as viewed in the lane changing direction thereof.

More specifically, lane change indicating manipulation (operation of a turn indicator) is detected, and then decision is made as to whether or not a succeeding motor vehicle had entered a predetermined range at the time point when the turn indicator was put into operation, whereon an alarm messaging possibility of the succeeding motor vehicle passing ahead is issued in dependence on the result of the above decision. For particulars, reference may have to be made to Japanese Patent Application Laid-Open No. 118036/1979 (FIGS. 1 to 3).

Further, in the hitherto known alarm apparatus of another type, the vehicle traveling situation is discriminatively identified on the basis of outputs of a steering angle sensor and a yaw rate sensor or navigation information to detect an object of concern existing in the direction determined from the vehicle traveling situation. When an obstacle is detected in a space surrounding the motor vehicle, then an alarm is issued. For particulars, reference may have to be made to Japanese Patent Application Laid-Open No. 233699/2000 (FIGS. 1 to 6).

In the conventional alarm apparatus for the motor vehicle such as disclosed in Japanese Patent Application Laid-Open No. 118036/1979, alarm messaging the existence of an obstacle rearward of the motor vehicle is issued on the basis of the output of the range-finding sensor only. Consequently, the alarm will be issued for all the objects which have entered a certain predetermined range. By way of example, the alarm will unnecessarily or undesirably be issued in response to detection of a stationary object (e.g. guardrail, barrier or the like) in addition to the succeeding motor vehicle, giving rise to a problem that erroneous alarms are likely to be frequently generated to uncomfortableness of the driver of the motor vehicle.

Of course, in the alarm apparatus disclosed in Japanese Patent Application Laid-Open No. 118036/1979 such measures are adopted for suppressing generation of the erroneous alarm by discriminatively identifying the vehicle traveling situation with the aim to enhance the accuracy of alarm generation. To this end, however, expensive instruments such as the yaw rate sensor and the navigation system are required as the information acquiring means for detecting the stationary object, incurring increase of the cost.

SUMMARY OF THE INVENTION

In the light of the state of the art described above, it is as an object of the present invention to provide an alarm apparatus in which generation of erroneous alarms in response to stationary objects such as a guardrail can positively be prevented.

In view of the above and other objects which will become apparent as the description proceeds, there is provided according to a general aspect of the present invention an alarm apparatus for a motor vehicle, which apparatus includes a distance sensor means for detecting a distance to an object existing rearward of the motor vehicle, a vehicle speed detecting means for detecting a vehicle speed of the motor vehicle, a traveling direction detecting means for detecting a traveling or heading direction sideward of the motor vehicle, a control means for generating an alarm signal on the basis of the distance to the object (object distance), the vehicle speed and the traveling direction, and an alarm means driven in response to the alarm signal.

The control means includes a time measuring means for measuring a time lapse since a time point of detection of the traveling direction, and an alarm range setting means for setting an alarm distance serving as a comparison reference for the object distance.

The alarm means is driven when the vehicle speed lies within a predetermined vehicle speed range with the time lapse falling within a predetermined time and when the distance to an object existing laterally rearward of the motor vehicle as viewed in the traveling direction lies within the alarm distance.

By virtue of the arrangement described above, there can be realized the alarm apparatus for the motor vehicle which is essentially immune from generation of erroneous alarms due to detection of a stationary object without incurring increase in the cost.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
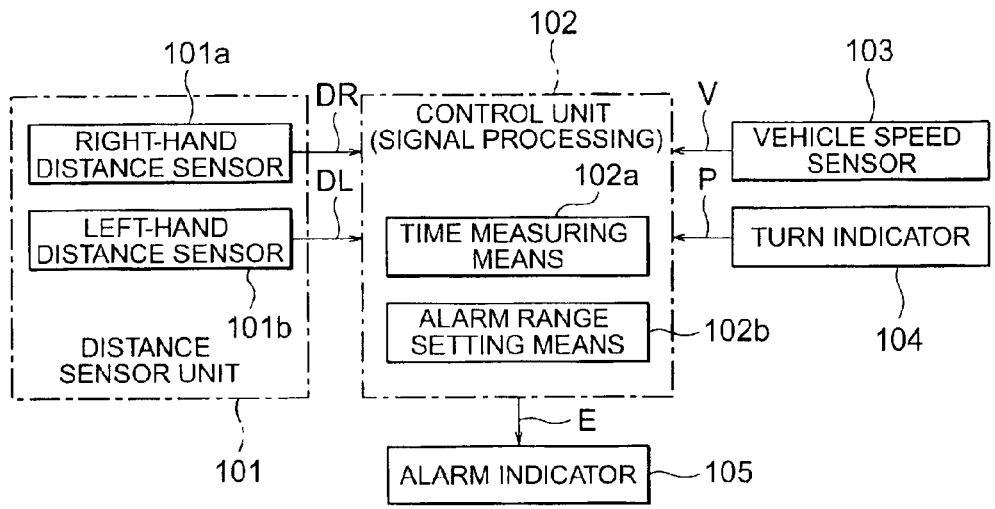
FIG. 1 is a bock diagram showing generally and schematically an exemplary structure of an alarm apparatus for a motor vehicle according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a bock diagram showing generally and schematically an exemplary structure of the alarm apparatus for a motor vehicle according to a first embodiment of the present invention.

Referring to FIG. 1, the alarm apparatus which is mounted on a motor vehicle is comprised of a range or distance sensor unit (distance sensor means) 101 which is comprised of a right-hand distance sensor 101a and a left-hand distance sensor 101b, a control unit 102 (control means) comprised of a time measuring means 102a and an alarm range setting means 102b, a vehicle speed sensor 103 for detecting a vehicle speed V of the own motor vehicle (i.e., the motor vehicle on which the alarm apparatus is mounted), a turn indicator 104 (traveling direction detecting means) which is designed to be lit when the traveling course of the motor vehicle is changed from one lane to another, and an alarm indicator 105 (alarm means) which is designed to be driven in response to an alarm signal E issued by the control unit 102.

Detection signals derived from the outputs of the distance sensor unit 101, the vehicle speed sensor 103 and the turn indicator 104 are supplied to the control unit 102, while the alarm signal E issued by the control unit 102 is inputted to the alarm indicator 105.

The distance sensor unit or means 101 is designed to detect a distance from the own motor vehicle equipped with the alarm apparatus to an object existing in the rear of the own motor vehicle, i.e., a right-hand rearward distance DR or a left-hand rearward distance DL. To this end, the distance sensor unit 101 is composed of the right-hand distance sensor 101a and the left-hand distance sensor 101b mounted on the motor vehicle independently on the left and right sides, respectively, for measuring the distance to the object from the rear of the motor vehicle. This distance will also be referred to as the object distance only for the convenience of description.

As the right-hand distance sensor, there may be employed a laser beam sensor and a radio wave sensor, being understood that the present invention is never restricted to any specific type of sensor.

Lighting of the turn indicator 104 is triggered in response to manipulation of a driver of the motor vehicle. In that case, a detection signal indicting the traveling direction P in which the motor vehicle is heading is outputted. In this conjunction, it should also be mentioned that the present invention is never restricted to the employment of the turn indicator 104. Any other appropriate detecting means may be employed so far as the traveling or heading direction P of the motor vehicle can be detected.

The time measuring means 102a is designed to measure the time T lapsed since the time point at which the traveling direction P was detected (i.e., the time point at which lighting of the turn indicator 104 was triggered).

The alarm range setting means 102b is designed to set an alarm distance which prescribes an upper limit of an alarm generation decision reference (described later on) for the the object distance Do (right-hand rearward distance DR or left-hand rearward distance DL).

The control unit 102 maybe constituted by a microcomputer designed for processing a variety of input signals. More specifically, the control unit 102 is so designed or programmed as to make decision whether or not an object such as a succeeding motor vehicle existing in the rear of the own motor vehicle is approaching (or passing ahead) the own motor vehicle on the basis of the detected object-distance Do (i.e., the right-hand rearward distance DR or the left-hand rearward distance DL as detected), the speed V of the own motor vehicle, the traveling direction P, the measured time lapse T and the preset alarm distance or range. When it is decided that the object such as the succeeding motor vehicle is approaching closely, the control unit 102 generates an alarm signal E to thereby activate the alarm indicator 105.

More specifically, the alarm signal E is generated when the distance Do to the object existing rearward of the own motor vehicle as viewed in the traveling or heading direction P thereof lies within the alarm distance on the conditions that the vehicle speed V is within a predetermined vehicle speed range and that the time lapse T mentioned above falls within a predetermined time (an upper-limit time for enabling the alarm generation, as described hereinafter).

Parenthetically, the alarm indicator 105 may be constituted not only by a display means but also by an alarm announcing means for messaging audibly the prevailing alarm status to the driver in response to the alarm signal E or by a combination thereof.

Next, by reference to a flow chart shown in FIG. 2, description will be made of operations or processings involved in the generation of the alarm in the vehicle-onboard alarm apparatus according to the first embodiment of the present invention described above by reference to FIG. 1.

Figure 2:
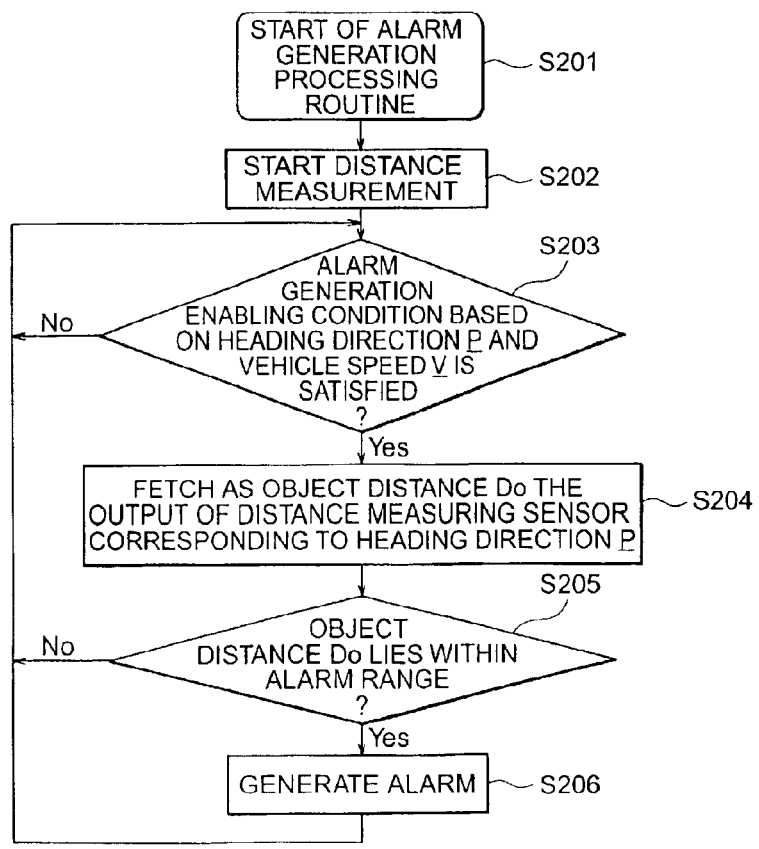
FIG. 2 is a flow chart for illustrating operations or processings involved in the generation of alarm in the alarm apparatus according to the first embodiment of the present invention.

Referring to FIG. 2, upon starting of the alarm processing procedure or routine in a step S201, the control unit 102 starts to execute a distance measure processing (range find processing) in a step S202, to store the right-hand rearward distance DR and the left-hand rearward distance DL, respectively, as the candidates for the object distance (distance to the object) Do rearward of the own motor vehicle.

In succession, decision is made whether or not the condition for effectuating the operation of the alarm indicator 105 (alarm generation) is satisfied by referencing the heading or traveling direction P derived from the output of the turn indicator 104 and the vehicle speed V derived from the output of the vehicle speed sensor 103 (step S203).

When the vehicle speed V is within a predetermined vehicle speed range (e.g. when the vehicle speed V is not lower than a lower-limit speed indicating an ordinary running speed and not higher than an upper-limit speed at which approaching of a succeeding motor vehicle can be neglected) and when the heading or traveling direction P is detected, it is determined that the alarm generation enabling condition is satisfied.

When it is determined in the step S203 that the alarm generation enabling condition is satisfied (i.e., when the decision step S203 results in affirmation "Yes"), the output signal of the distance sensor unit 101a or 101b which corresponds to the heading or traveling direction P as detected is adopted as the signal indicative of the object distance Do.

By way of example, in the case where the heading or traveling direction P indicates that the motor vehicle is moving toward the right-hand lane, then the right-hand rearward distance DR is adopted as the object distance Do (i.e., distance to the object).

Finally, in a step S205, decision is made as to whether or not the own motor vehicle is in the close vicinity state (within an alarm region described later on) in which there arises the possibility that the own motor vehicle may collide with the succeeding motor vehicle on the basis of the object distance Do, the time lapse T from the time point at which the turn indicator 104 has been put into operation (i.e., from the time point at which the heading or traveling direction P has been detected) and the alarm distance.

When it is decided that the own motor vehicle is in the close vicinity state mentioned above (i.e., when the step S205 results in "Yes"), the alarm signal E is generated to drive the alarm indicator 105 in a step S206, whereupon the step S203 is resumed.

On the contrary, when it is decided in the step S205 that the own motor vehicle is not in the close vicinity state (i.e., when the decision step S205 results in negation "No"), the step S203 is resumed without executing the alarm generation step S206.

Next, referring to FIGS. 3 and 4, the decision processings in the steps S203 and S205 shown in FIG. 2 will be described in the concrete.

Figure 3:
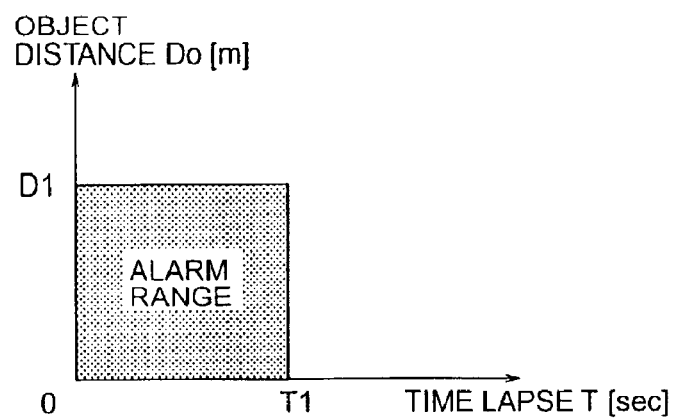
FIG. 3 is a view for illustrating an alarm range according to the first embodiment of the present invention.

FIG. 3 is a view for illustrating an alarm range which is referenced in making decision as to whether or not the alarm is to be generated.

Referring to FIG. 3, the alarm range is determined by an alarm distance [m] adopted as the reference for comparison with the object distance Do (ordinate) and a predetermined time T1 [sec] adopted as the reference for comparison with the time lapse T (abscissa).

Figure 4:
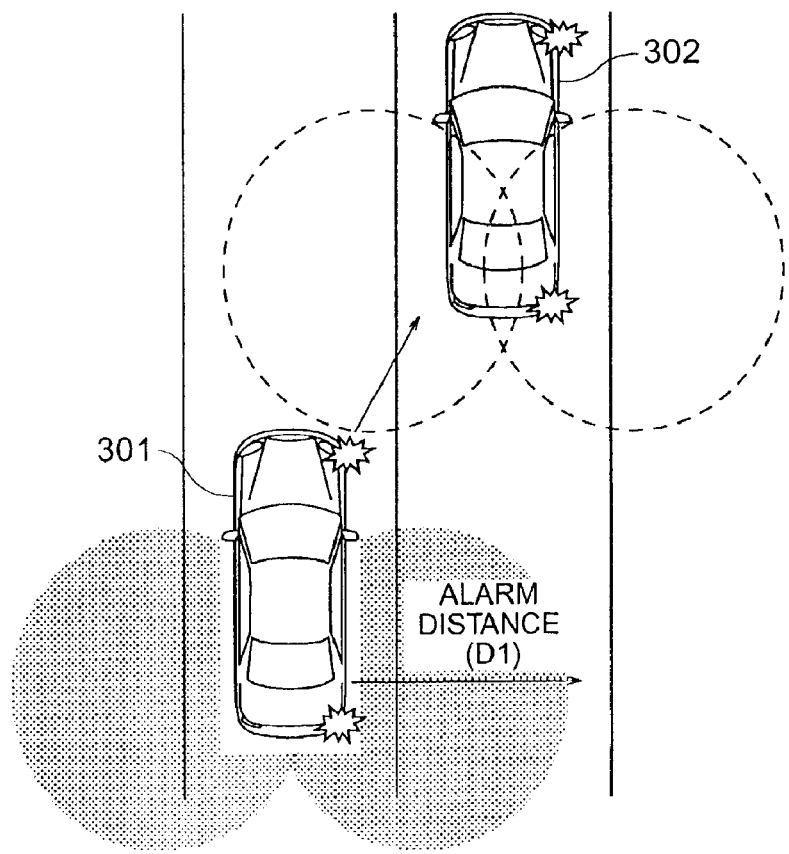
FIG. 4 is a view for illustrating a motor vehicle traveling situation on a road in association with an alarm distance according to the first embodiment of the present invention.

FIG. 4 is a view for illustrating a motor vehicle traveling situation on a road in association with the alarm distance D1.

In FIG. 4, there are shown positions 301 and 302 of a motor vehicle before and after the lane change together with the alarm distance D1. More specifically, it is shown in a plan view that the motor vehicle traveling on the left lane on a road, as indicated by reference numeral 301, makes transition to the right lane, as indicated by 302.

As described previously, the control unit 102 is constantly supplied with the detection signal (signal DR, DL indicating the distance to the object existing rearward of the own motor vehicle) from the distance sensor unit 101 and the detection signal (vehicle speed V) from the vehicle speed sensor 103.

In the situation illustrated in FIG. 4, it is assumed that the motor vehicle traveling at the vehicle position 301 is making transition to the vehicle position 302, i.e., changing the left lane to the right lane as viewed in the figure while putting into operation the turn indicator 104. Then, the detection signal (indicating the heading direction P) is inputted to the control unit 102 from the turn indicator 104, whereupon the decision processings (steps S203 and S205) shown in FIG. 2 are executed.

At first, decision is made as to whether or not the alarm generation enabling condition is satisfied on the basis of the vehicle speed V at the time point at which the traveling direction P is detected (step S203).

Further, the time lapse T since the detection of the heading or traveling direction P is measured while the alarm distance D1 is set on the basis of the output of the distance measuring sensor (indicating the object distance Do in the traveling direction P).

Furthermore, the alarm range is set on the basis of the predetermined time T1 and the alarm distance D1, as illustrated in FIG. 3. In this case, it is required for generating the alarm that the time lapse T since lighting of the turn indicator 104 falls within a predetermined time T1 and that the object distance Do is shorter than the alarm distance D1 inclusive. In other words, the alarm range is defined by the predetermined time T1 and the alarm distance D1.

When it is decided in the step S203 that the alarm generation enabling condition is satisfied, then the object distance Do and the time lapse T are compared with the alarm range (i.e., alarm distance D1 and predetermined time T1, respectively), to thereby determine whether the close vicinity state for which the alarm is to be generated is prevailing or not (step S205). When the object distance Do and the time lapse T fall within the alarm range, then the alarm indicator 105 is activated.

In case an obstacle exists in the rear of the own motor vehicle (at a blind spot) when the driver is going to change the lane, the alarm is issued. In this way, security can be ensured upon changing of the lane.

Since the predetermined time T1 representing the upper limit of the time lapse T is preset as the close vicinity state decision enabling condition (alarm range), no alarm is generated for a stationary object. Thus, generation of the erroneous alarm can be prevented.

By way of example, let's suppose that a stationary object such as a guardrail is approaching the motor vehicle in the course of lane changing operation from the vehicle position 301 to the vehicle position 302 and decided as an obstacle. In that case, however, since the upper-limit time (predetermined time T1) for enabling the alarm generation will have lapsed during the lane changing operation, the stationary object such as the guardrail can be excluded from a set of objects for which the alarm is to be generated.

As is apparent from the above, by setting the alarm range (see FIG. 3) by using only the necessary minimum information (the alarm distance D1 and the predetermined time T1), it is possible to prevent generation of erroneous alarm in response to detection of a stationary object without increasing the cost therefor.

Embodiment 2

In the case of the alarm apparatus according to the first embodiment of the invention, the alarm distance D1 used as a parameter for determining the alarm range (see FIG. 3) is set to a constant value. In the alarm apparatus according to a second embodiment of the present invention, the alarm distance is decreased as a function of the time lapse T since the time point at which the turn indicator 104 has been operated for the purpose of avoiding more positively the generation of the erroneous alarm due to approaching to a stationary object (such as a guardrail) in the course of the lane changing operation.

In the following, description will be made of the vehicle-onboard alarm apparatus according to the second embodiment of the invention by reference to FIGS. 5 and 6 together with FIGS. 1 and 2.

The structure of the alarm apparatus according to the instant embodiment of the invention as well as the processing procedure executed by the control unit 102 thereof are essentially same as those described hereinbefore by reference to FIGS. 1 and 2.

The alarm apparatus according to the second embodiment differs from the first embodiment in that the alarm range setting means 102b (see FIG. 1) includes an alarm distance varying means for setting variably the alarm distance as a function of the time lapse T so that the alarm distance decreases as the time lapse T increases.

Figure 5:
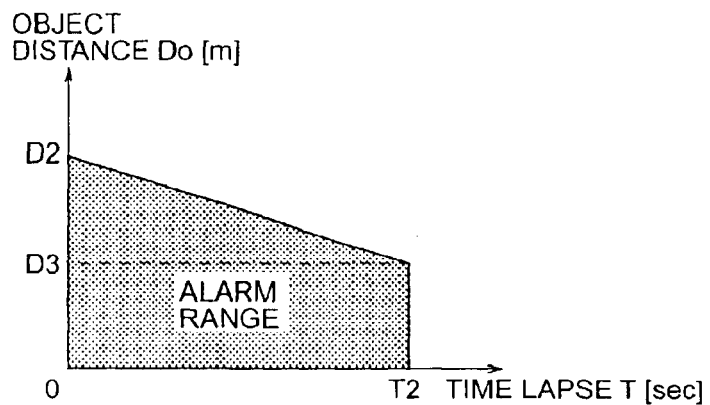
FIG. 5 is a view showing an alarm range for the alarm apparatus according to a second embodiment of the present invention.
Figure 6:
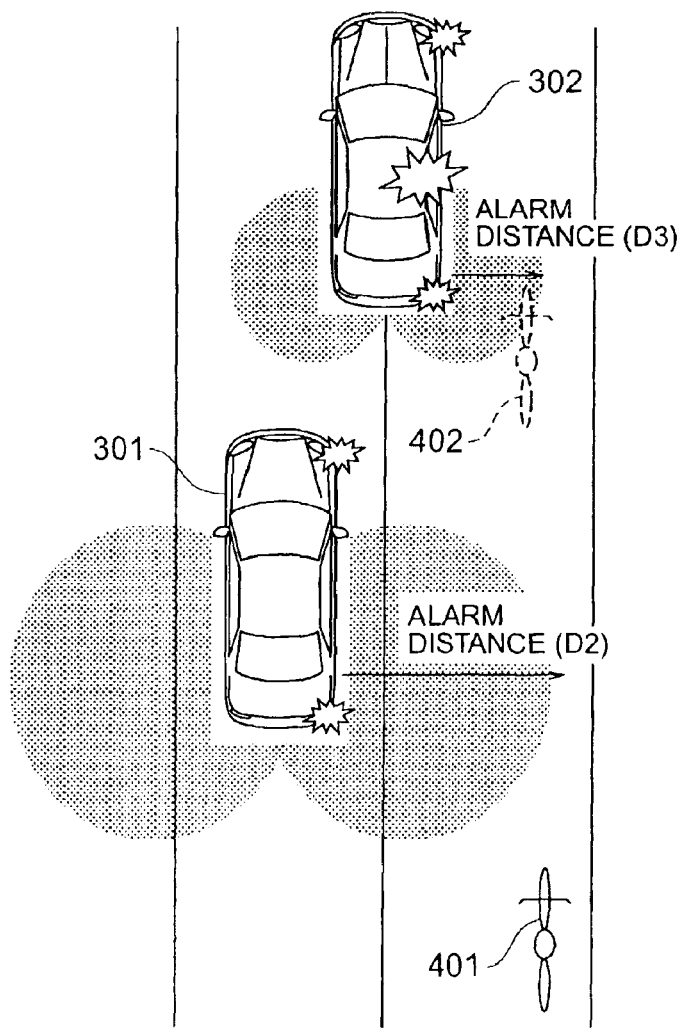
FIG. 6 is a view for illustrating a motor vehicle traveling situation on a road in association with the alarm distance according to the second embodiment of the present invention.

FIG. 5 is a view showing the alarm range set according to the technique of the invention incarnated in the second embodiment thereof and FIG. 6 is a view for illustrating a motor vehicle traveling situation. Obviously, FIGS. 5 and 6 correspond, respectively, to FIGS. 3 and 4 mentioned hereinbefore.

As can be seen in FIG. 5, the alarm distance [m] (one parameter for determining the alarm range) taken along the ordinate gradually decreases as the time lapse T [sec] since the heading direction detecting time point increases.

The reason why the alarm distance is caused to decrease as the time lapse from the time point at which the lane changing operation is started can be explained by the fact that the possibility of generation of the erroneous alarm in response to detection of a stationary object existing on the roadside becomes high, which must be suppressed to a possible minimum.

In the state illustrated in FIG. 6, such a traffic situation is presumed in which another motor vehicle such as a motorcycle is traveling on a right-hand lane from a position 401 rearward of the own motor vehicle traveling on the left-hand lane adjacent to the own motor vehicle toward a vehicle position 402.

Referring to FIG. 6, when the driver intends to change the lane by heading the own motor vehicle toward the position 302 from the position 301, the alarm is generated through the procedure described previously in conjunction with the first embodiment of the invention in the case where an obstacle exists rearward in the close vicinity to the own motor vehicle (i.e., at the blind spot)

In this way, with the alarm apparatus according to the instant embodiment of the invention, the alarm can be generated by determining the approaching state of the succeeding motor vehicle with high reliability while avoiding generation of the erroneous alarm due to approaching to a stationary object.

Of course, when a succeeding motor vehicle enters the alarm range (alarm distance D3) unexpectedly when the own motor vehicle is moving from the position 301 to the position 302, the alarm is generated.

By taking into consideration the predetermined time (upper-limit value) T2 for the time lapse T as the alarm enabling condition, the time duration for enabling the alarm can arbitrarily be set.

Embodiment 3

In the case of the alarm apparatus according to the first and second embodiments of the present invention, no consideration has been paid to the vehicle speed V in setting the alarm range. In the alarm apparatus according to a third embodiment of the present invention, the alarm distance is increased as a function of the vehicle speed V of the own motor vehicle in consideration of the fact that when the own motor vehicle is traveling at a high speed, the succeeding motor vehicle will also travel at a high speed.

In the following, by reference to FIG. 7 together with FIGS. 1 and 2, description will be made of the alarm apparatus according to the third embodiment of the present invention which is so arranged as to increase the alarm distance as the vehicle speed V increases.

The structure of the alarm apparatus according to the instant embodiment of the invention as well as the processing procedure executed by the control unit 102 thereof are essentially same as those described hereinbefore by reference to FIGS. 1 and 2.

Figure 7:
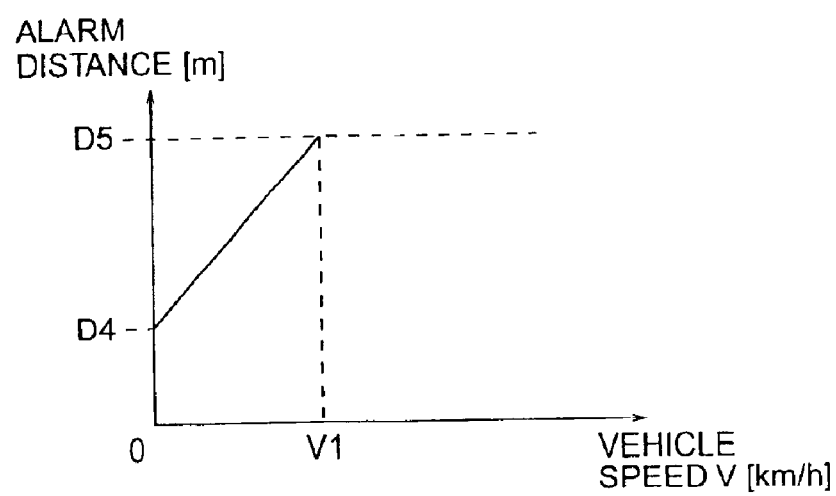
FIG. 7 is a view for illustrating a processing for setting variably the alarm distance according to a third embodiment of the invention.

FIG. 7 is a view for illustrating a processing for setting variably the alarm distance according to the third embodiment of the invention.

Referring to FIG. 7, the alarm distance [m] taken along the ordinate gradually increases from a minimum value D4 to a maximum value D5 as the vehicle speed V [km/h] increases and is set to the maximum value D5 when the vehicle speed V has attained a predetermined vehicle speed V1.

In this case, the alarm range setting means 102b incorporated in the control unit 102 (see FIG. 1) includes an alarm distance varying means for setting variably the alarm distance in dependence on the vehicle speed V for increasing the alarm distance as the vehicle speed V increases and setting the alarm distance fixedly to the maximum value (upper-limit value) D5 when the vehicle speed V is higher than the predetermined vehicle speed V1 inclusive.

By taking into account the vehicle speed V as the condition for defining the alarm range by setting variably the alarm distance in dependence on the vehicle speed V, the alarm generation enabling condition can be varied or changed in accordance with the vehicle traveling state.

Thus, when the own motor vehicle is traveling at a high speed, the alarm can be generated even for a succeeding motor vehicle which travels with a relatively long distance to the own motor vehicle.

Embodiment 4

In the case of the alarm apparatus according to the first to third embodiments of the present invention, the predetermined time for determining the alarm range is set to a predetermined value (e.g. T1, T2). In the alarm apparatus according to a fourth embodiment of the present invention, the predetermined time is decreased as a function of the vehicle speed V in consideration of the fact that when the motor vehicle is traveling at a high speed, the distance to the succeeding motor vehicle increases with the number of the succeeding motor vehicles at the blind spot being decreased.

In the following, by reference to FIG. 8 together with FIGS. 1 and 2, description will be made of the alarm apparatus according to the fourth embodiment of the present invention which is so arranged as to decrease the predetermined time as the vehicle speed V increases.

The structure of the alarm apparatus according to the instant embodiment of the invention as well as the processing procedure executed by the control unit 102 are essentially same as those described hereinbefore by reference to FIGS. 1 and 2.

Figure 8:
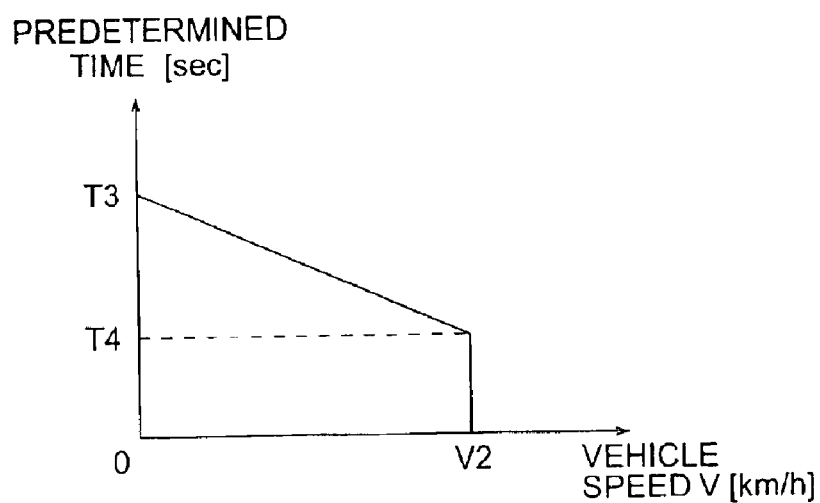
FIG. 8 is a view for illustrating a processing for setting variably a predetermined time according to a fourth embodiment of the invention.

FIG. 8 is a view for illustrating a processing for setting variably the predetermined time according to the fourth embodiment of the invention.

Referring to FIG. 8, the predetermined time [sec] taken along the ordinate gradually decreases from a maximum value T3 to a minimum value T4 as the vehicle speed V [km/h] taken along the abscissa increases and is set to zero when the vehicle speed V has attained the predetermined vehicle speed V2.

In this case, the control unit 102 (see FIG. 1) includes a predetermined time varying means for setting variably the predetermined time in dependence on the vehicle speed V for decreasing the predetermined time as the vehicle speed V increases and setting the predetermined time fixedly to zero when the vehicle speed V is higher than the predetermined vehicle speed V2 inclusive.

By taking it into account the vehicle speed V as the condition for defining the alarm range, the alarm generation enabling condition can be varied or changed in accordance with the vehicle traveling situation, while the optimal alarm range can be determined by setting the predetermined time in the high-speed traveling state shorter than that in the low-speed traveling state.

Many modifications and variations of the present invention are possible in the light of the above techniques. It is therefore to be understood that within the scope of the appended claims, the invention may be practiced otherwise than as specifically described.

What is claimed is:

1. An alarm apparatus for a motor vehicle, comprising:

distance sensor means for detecting an object distance existing rearward of said motor vehicle;

vehicle speed detecting means for detecting a vehicle speed of said motor vehicle;

traveling direction detecting means for detecting a traveling direction sideward of said motor vehicle;

control means for generating an alarm signal on the basis of said object distance, said vehicle speed and said traveling direction; and alarm means driven in response to said alarm signal, wherein said control means includes:

time measuring means for measuring a time lapse since a time point of detection of said traveling direction; and alarm range setting means for setting an alarm distance serving as a comparison reference for said object distance, wherein said alarm means is driven when said vehicle speed lies within a predetermined vehicle speed range with said time lapse falling within a predetermined time and when said object distance to an object existing laterally rearward of said motor vehicle as viewed in said traveling direction lies within said alarm distance.

2. An alarm apparatus for a motor vehicle according to claim 1, said alarm range setting means including first alarm distance varying means for setting variably said alarm distance in dependence on said time lapse, wherein said first alarm distance varying means decreases said alarm distance as said time lapse increases.

3. An alarm apparatus for a motor vehicle according to claim 1, said alarm range setting means including second alarm distance varying means for setting variably said alarm distance in dependence on said vehicle speed, wherein said second alarm distance varying means increases said alarm distance as said vehicle speed increases.

4. An alarm apparatus for a motor vehicle according to claim 3, wherein said second alarm distance varying means sets said alarm distance fixedly to a predetermined upper-limit value when said vehicle speed is higher than a first predetermined vehicle speed inclusive.

5. An alarm apparatus for a motor vehicle according to claim 1, said control means including predetermined time varying means for setting variably said predetermined time in dependence on said vehicle speed, wherein said predetermined time varying means decreases said predetermined time as said vehicle speed increases.

6. An alarm apparatus for a motor vehicle according to claim 5, wherein said predetermined time varying means sets said predetermined time fixedly to zero when said vehicle speed is higher than a second predetermined vehicle speed inclusive.

* * * * *